Nov. 19, 1963   F. A. MILLER ETAL   3,111,347
HUB CAP CONSTRUCTION
Filed March 11, 1963
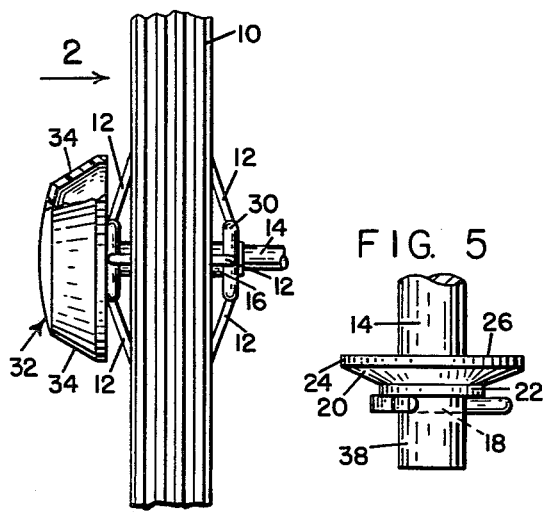
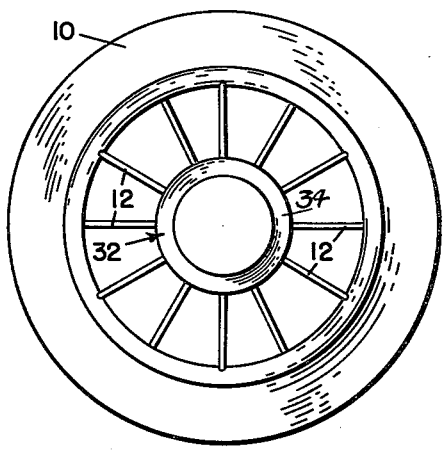
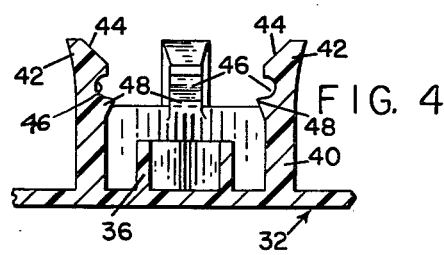
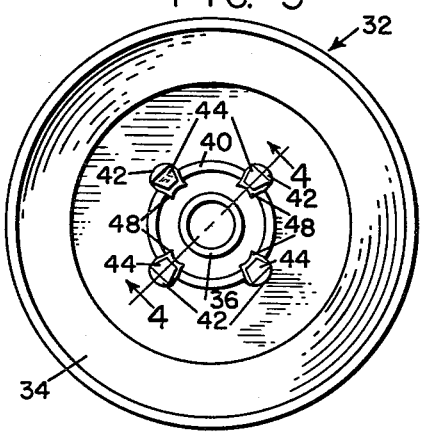
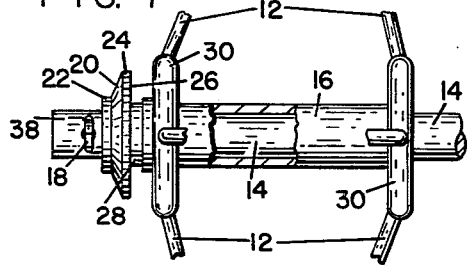
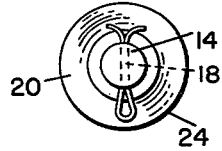
INVENTORS
FRANCIS A. MILLER
JOSEPH H. ALBERT
BY
ATTORNEY

United States Patent Office 3,111,347
Patented Nov. 19, 1963

3,111,347
HUB CAP CONSTRUCTION
Francis A. Miller and Joseph H. Albert, Leominster, Mass., assignors to Joseph P. Miller Co., Inc., Leominster, Mass., a corporation of Massachusetts
Filed Mar. 11, 1963, Ser. No. 264,343
5 Claims. (Cl. 301—108)

This invention relates to a new and improved wheel hub cap construction particularly adapted for baby carriages, strollers, and similar vehicles although usable wherever desired or convenient. The principal object of the invention resides in the provision of a plastic ornamental hub which is quickly and easily applied and locked to the ends of the shafts upon which the carriage or stroller wheels are mounted.

A further object of the invention resides in the provision of a plastic hub cap particularly adapted for application to the ends of a shaft upon which the wheels are mounted, the plastic hub being provided at one side with a series of integrally molded laterally extending prongs or fingers which cooperate with a plastic washer mounted on the shaft so that when the shaft is in position on the running gear of the carriage with the ends extending from the wheels, the wheels being mounted on the extending ends of the shafts, the new plastic hub cap need only be thrust onto the end of the shaft for the cooperative locking of the washer with said prongs, and even though the washer is loosely mounted, the hub of the wheel itself acts as a backstop to hold the washer in position so that it is not forced inwardly along the shaft but instead is forced onto the hub cap and snapped into the prongs.

The invention further relates to arrangements and combinations of parts which will be hereinafter described and more particularly set forth in the appended claims.

Reference is to be had to the accompanying drawings, in which:

FIG. 1 is a view in elevation illustrating the invention, part being in section;

FIG. 2 is a side view thereof, looking in the direction of arrow 2 in FIG. 1;

FIG. 3 is a view on en enlarged scale, showing in elevation the interior of the hub cap;

FIG. 4 is an enlarged section on line 4—4 of FIG. 3;

FIG. 5 is a view illustrating the washer as mounted on an end of a wheel shaft, part being in section;

FIG. 6 is an end view of the washer and shaft shown in FIG. 5, and

FIG. 7 is a view illustrating the shaft and washer in place ready for the application of the hub cap thereto.

The invention is shown in FIGS. 1 and 2 as applied to a wheel having a tire 10 and spokes 12 mounted on a shaft 14 in the usual way, the wheel having a hub 16 receiving the shaft, the shaft extending through this hub. The end portions of the shaft are provided with cotterpins 18 shown in FIGS. 5, 6 and 7.

Just inside the cotterpin on the shaft there is provided a new and improved plastic washer generally indicated by the reference numeral 20. This plastic washer may take many forms but it preferably has a hub 22 which can rest against the cotterpin and it has a flared solid outwardly extending rim or flange with narrowed edges 24 for a purpose to be described. This washer also has a flat surface 26 and when the wheels are assembled on the shaft 14 this washer will abut an outwardly extending rim 28 which is a part of hub 16. Hub 16 also mounts the spoke-holding members 30. Thus it will be seen that the washers 20 are held in position as shown in FIG. 7 and although these washers may be loosely mounted on shaft 14, they cannot move inwardly, i.e., to the right in FIG. 7, because they abut the member 28 on the hub 16.

The new hub is molded of plastic in one piece. It is indicated by the reference numeral 32. Preferably it has an outstanding flange or skirt 34 being generally hollow or dish-shaped. Centrally thereof at the interior or flange side it is provided with an upstanding generally cylindrical member 36 which is adapted to receive the extending end 38 of the shaft 14 when the parts are assembled. It also has a concentric and larger upstanding generally cylindrical portion 40 and this portion is not only larger in diameter than the cylindrical member 36 but it extends to a greater extent (see FIG. 4). Integrally molded with the cylindrical conformation 40 are a series of snap fingers or prongs 42. These as shown extend generally upwardly and are provided at their ends with inwardly directly downwardly slanting wedging surfaces 44 terminating in notches 46. The bottom portions of notches 46 are defined by inwardly projecting shoulders or abutments 48. It is to be understood that the fingers 42 are relatively resilient although being strong and self-sustaining.

With the washers 20 in position as shown in FIG. 7, all that is necessary to do to apply the new plastic hub is to position it with the end 38 of the shaft entering the cylindrical member 36 and centering the hub cap. Then a sharp blow or rap on the outside surface of the hub cap as for instance a pressure on the hub cap to the right in FIG. 1 causes the flange portion or edge 24 of the washer to be snapped into the notches 46 as indicated in dotted lines in FIG. 4. The hub cap is then completely assembled and although it can be later removed by force, it will not drop off by accident.

Having thus described our invention and the advantages thereof, we do not wish to be limited to the details herein disclosed, otherwise than as set forth in the claims, but what we claim is:

1. The combination of a plastic hub cap construction with a shaft upon which a wheel hub is mounted, and a separate washer mounted on the shaft in contact with the hub of the wheel, said hub cap construction comprising a base, a set of resilient fingers on the base, each finger terminating in an inwardly and downwardly slanting surface terminating in a notch, said notches together forming a receptacle arranged generally circularly, said hub cap being applied to said washer by forcing the base in a direction to cause the washer relatively to slide down said slanting surfaces and snap into the receptacle.

2. The combination of a substantially rigid, plastic hub cap construction with a wheel shaft upon which is mounted a washer slightly inwardly from the end of the shaft and means holding the washer in position against dislodgment, the hub cap comprising a generally dish-shaped member and an integral arcuately arranged series of resilient fingers extending laterally from one side thereof concentrically with respect thereto, each of said fingers being provided with inwardly directed notches, said notches generally facing each other and together forming a receptacle for the snap-in reception of the edges of the washer, the washer having a diameter greater than the closest approach of the fingers toward each other and fitting in the series of notches.

3. The combination of a rigid plastic hub cap construction with a wheel, a shaft, the wheel having a hub mounted on the shaft, the shaft extending slightly outwardly from one end of said hub, a radially outstanding element on the shaft located slightly inwardly from an end thereof, a plastic washer mounted on the shaft between the element and the hub of the wheel and held therebetween, the cap construction comprising a one-piece plastic dish-shaped member, a circularly arranged series of fingers extending laterally therefrom, said fingers being integral therewith, said fingers between them defining an area slightly less than the area of the washer, means forming abutments on each of said fingers, said abutments facing each other, each finger having a notch adjacent the abutments but closer to the ends of the fingers, said notches being adapted to receive edge portions of the washer with the washer engaging the abutments.

4. The combination recited in claim 3 including a generally cylindrical open ended member arranged centrally of said hub cap concentrically arranged with respect to said resilient fingers and receiving the end of the shaft centering the hub thereon.

5. The combination of a shaft, a wheel, a hub on the wheel, the hub being mounted on the shaft, and a holding element on the shaft adjacent an end thereof, a washer between an end of the hub and said holding means and held thereby, with a hub cap comprising a one-piece rigid plastic base member, a series of semi-resilient self-sustaining plastic members extending from a side surface thereof, notches on said fingers together forming means for receiving the edge portions of said washer, said notches between them forming an interrupted annular receptacle having a diameter substantially equal to that of the washer and being adapted to hold the washer therein, and means forming the notches providing abutments to prevent dislodgment of the washer from the fingers.

References Cited in the file of this patent
UNITED STATES PATENTS

| | | |
|---|---|---|
| 2,241,686 | Ware | May 13, 1941 |
| 2,775,372 | Jordan | Dec. 25, 1956 |
| 2,884,160 | Abplanalp | Apr. 28, 1959 |
| 2,889,089 | Herrick | June 2, 1959 |